Dec. 5, 1939.  F. R. KAIMER  2,182,667
ELECTRICAL CABLE
Filed April 14, 1937
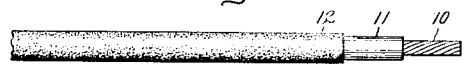
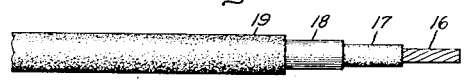
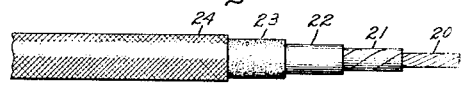
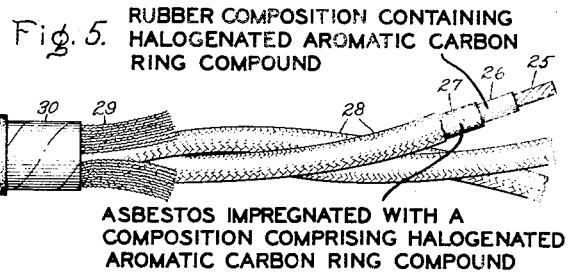
Inventor:
Fred R. Kaimer,
by Harry E. Dunham
His Attorney.

Patented Dec. 5, 1939

2,182,667

UNITED STATES PATENT OFFICE 2,182,667

ELECTRICAL CABLE

Fred R. Kaimer, York, Pa., assignor to General Electric Company, a corporation of New York Application April 14, 1937, Serial No. 136,756

10 Claims. (Cl. 174—121)

The present invention relates to an electrical cable. It relates more particularly to, and has as a main object to provide a flexible, flame- and moisture-resisting electrical cable of high dielectric strength wherein is utilized a novel combination of insulating materials.

It has been suggested heretofore to produce electrical insulation comprising rubber and chlorinated naphthalene. It also has been proposed to impregnate fabric materials used in covering wires with compositions comprising halogenated aromatic carbon ring compounds, thereby to make such materials fire-resisting. It also has been suggested to apply to a metallic conductor conventional rubber insulation, that is a rubber composition containing no halogenated aromatic carbon ring compound, and then to apply, over the latter, fabric material impregnated with a substance containing halogenated aromatic carbon ring compound, plasticizer and inert filler.

The present invention differs from such structures in that it provides an insulated electrical conductor covered with composite insulation comprising a heat-, flame- and moisture-resisting rubber compound containing halogenated aromatic carbon ring compound, together with heat-resisting insulation such as asbestos coated and impregnated with a composition comprising halogenated aromatic carbon ring compound. As a result an insulated electrical cable having outstanding heat, flame and moisture resistance is produced without any sacrifice in flexibility, dielectric strength or other physical or electrical characteristics as heretofore has been the case.

Among the most familiar halogenated aromatic carbon ring compounds are those products known under the trade name of "Halowax." Such substances are chlorinated naphthalenes, principally tri-, tetra-, penta- and hexachlor naphthalene, with or without various plasticizers or other ingredients that may be required to produce compositions of the desired consistency or fluidity. "Halowax" substances of various types or kinds may be used in practicing the present invention.

For a consideration of what is believed to be novel and the invention, attention is directed to the following specification and the claims appended thereto.

In the drawing accompanying and forming part of this application Figure 1 is a fragmentary view in elevation of a cable of the single-conductor type constructed in accordance with the present invention, part of the insulation being shown as removed to indicate more clearly the layers thereof; Figures 2, 3 and 4 are similar views of somewhat modified constructions of single-conductor cables in accordance with the invention; and Figure 5 is a similar view of a cable of the multiple-conductor type made in accordance with the invention.

In Figure 1 the numeral 10 designates a conductor which has been shown for the sake of illustration in this and other figures of the drawing as of the single stranded type and which is of any suitable metal, for instance copper. Directly on the conductor is applied, for example by extrusion, a layer 11 consisting of a heat-, flame- and moisture-resisting rubber compound having as one essential ingredient a composition comprising halogenated aromatic carbon ring compound such as highly chlorinated naphthalene. For brevity, the term "flame-resisting rubber" hereinafter will be used when referring to this particular rubber compound. The composition of a rubber compound that has been found to be especially adapted for carrying the present invention into effect will be described more fully hereinafter.

Directly over the rubber insulation is applied one or more layers 12 of felted asbestos, preferably felted long fibre asbestos. The loosely applied asbestos is compressed and impregnated, to form a continuous and concentric homogeneous layer, with a composition comprising halogenated aromatic carbon ring compound such, for instance, as chlorinated naphthalene. A more specific example of a suitable composition is a light-colored "Halowax" compound having a flow point of about 70° to 74° C., a specific gravity of about 1.49 to 1.53, a penetration of about 40 to 44, a working temperature of about 100° to 105° C., and comprising a plasticized chlorinated naphthalene of a high degree of chlorination.

Unlike asbestos, which is a poor dielectric material, halogenated organic substances such as chlorinated naphthalene have excellent dielectric properties. The combination of such material with rubber and asbestos provides composite insulation of improved dielectric strength. It is advantageous to apply sufficient of the composition comprising halogenated aromatic carbon ring compound not only to impregnate the asbestos but also to form a continuous layer on, or in conjunction with the asbestos. In this manner air is excluded to a substantial degree, as well as practically all light, from the underlying rubber layer thereby obviating oxidation, cracking or other deterioration of the rubber. The presence of the halogenated compound in and on the asbestos layer increases the flame and moisture resistance of the insulation as a whole. For brevity, the term "treated felted asbestos" hereinafter will be used when referring to felted asbestos impregnated and coated as has just been described.

In Figure 2, which is illustrative of another embodiment of this invention, the layers of flame-resisting rubber and treated felted asbestos are shown as being superposed on the conductor in the opposite order from that shown in Figure 1. As shown in Figure 2, a metallic conductor 13 may be covered first with a layer 14 of treated felted asbestos, as that material hereinbefore has been defined, and over the asbestos layer then may be applied, for instance by extrusion, a layer 15 of the flame-resisting rubber compound used in practicing this invention.

For certain conditions of service use it may be advantageous to interpose a flame-resisting rubber layer between two layers of treated felted asbestos. Such a mode of construction is shown in Figure 3. In the figure a metallic conductor 16 is shown as being covered with a layer 17 of treated felted asbestos, over which is superposed a layer 18 of flame-resisting rubber, and over the whole a second layer of treated felted asbestos 19.

In Figures 1, 2 and 3 the composite insulation illustrated in the individual figures, and hereinbefore more fully described, has been shown as being superposed directly on the conductor. However, in accordance with another embodiment of my invention, a separator composed of suitable electrically insulating material may be applied directly on the conductor. The separator or separating layer is then covered with composite insulation of the kind shown by way of illustration in Figures 1, 2 and 3. In Figure 4, which is illustrative of this embodiment of my invention, a metallic conductor 20 is shown as having superposed thereon a separator 21 composed, for example, of regenerated cellulose, cellulose acetate, paper, cotton, or the like, in tape or other form. Over the layer 21 is applied a layer 22 of flame-resisting rubber and over the rubber layer a layer 23 of treated felted asbestos. The order of layers 22 and 23 may be reversed or a layer of flame-resisting rubber may be placed between two layers of treated felted asbestos. The resultant insulated cable may be used as such. However, if desired or when required, a protective or an identification covering 24 may be applied over the whole. This covering may take the form of a fibrous braid, such as silk, rayon, cotton or asbestos braid, or suitable combinations thereof, as may be required or as conditions may necessitate. Any base color of braid, with or without various stripes of different colors woven therethrough, may be used to obtain braided conductors of distinctive markings. The braided covering is then coated and impregnated with a composition comprising plasticized normally solid halogenated aromatic carbon ring compound such as a light-colored, wax-like "Halowax" compound that is solid yet flexible (in a thin layer) at ordinary room temperatures and having a flow point of about 122° C.; and a working temperature of about 125° to 150° C. Such treatment excludes air and improves the flame and moisture resistance of the insulation structure. Further, the flexibility of the composition tends to prevent the formation of cracks through which moisture otherwise might readily enter the fabric and form a path through which current could leak in event of unexpected cracking or other injury to the underlying layers of flame-resisting rubber and coated and impregnated felted asbestos. Treatment of the fabric with the flame-proofing halogenated compound prevents the fabric from smoldering in case of fire, since normally combustible material thus treated will not support combustion.

A protective covering such as the braided covering just described also may be superposed on the composite insulation illustrated in Figures 1, 2 and 3. In lieu of a braided protective covering of fibrous material, or in conjunction therewith, a sheath or armor such as a flexible metal armor, for instance of the basket weave type, may be used.

In the multiple-conductor cable shown in Figure 5 as illustrative of another embodiment of this invention, each single metallic conductor 25 is covered with composite insulation of the kind shown in, and described hereinbefore with reference to, Figures 1 to 4, inclusive. In Figure 5 conductor 25 is shown, by way of example, as having superposed thereon a layer 26 of flame-resisting rubber over which is applied a layer 27 of treated felted asbestos, and over the latter a protective covering 28. This covering may take the form previously described more fully with reference to numeral 24 in Figure 4, although it is not necessary to have a metal armor as a covering at this point in the construction of a multiple conductor cable.

The single conductors covered in the manner described are then formed into a multiple-conductor cable in accordance with methods well known in the art. By way of illustration a three-conductor cable is shown in Figure 5. To maintain the circularity of cross-section within a desired diameter, filling material 29, preferably flame-resisting filling material composed mainly of asbestos, is used in forming the multiple-conductor cable. A suitable filling substance is one consisting of, for example, from about 5 to 20 per cent of cotton fibre and the remainder asbestos. The filling material is impregnated with a solution of halogenated aromatic carbon ring compound. A more specific example of a suitable composition is a liquid "Halowax" composition containing about 65 per cent of solids and comprising plasticized chlorinated naphthalene dissolved in a solvent such as toluol. After impregnating the asbestos filler with such composition, the solvent is evaporated.

The grouped conductors are then bound together by a suitable tape or thread as shown at 30. Preferably a binding tape of, for example, cellulose acetate or regenerated cellulose, or a thin single-faced friction tape, is used when the impregnants for the felted asbestos are dark in color. The tape prevents the discoloration of the identification markings on the single conductors in addition to binding the individual conductors together. If clear or light-colored impregnating solutions are used in treating the asbestos, the binding tape may be eliminated and binding threads used instead.

Over the bound electrically insulated and protectively covered single conductors, brought to circular cross-section as hereinbefore described, is then applied a uniform covering of asbestos 31, preferably felted asbestos roving. An asbestos roving reinforced with a cotton core and containing, for example, from about 5 to 20 per cent by weight of cotton fibre, including the cotton core, advantageously may be used. The asbestos layer is compressed and impregnated, to form a continuous and homogeneous layer with a composition comprising a plasticized halogenated aromatic carbon ring compound, for example a solvent solution of a "Halowax" compound such as above described with reference to the impregnation of filling material.

Over the asbestos layer 31 advantageously is next applied one or more layers of moisture-resisting electrically insulating material 32, thereby to improve the dielectric strength and moisture resistance of the structure. Examples of materials suitable for this purpose are cellulose esters such as cellulose acetate, regenerated cellulose, flexible alkyd resins, plasticized polymerized vinyl compounds such as plasticized polymerized vinyl chloride, and like or equivalent moisture-resisting insulating materials.

Preferably one or more spirally wound layers of varnished cambric tape are applied over the asbestos layer 31, followed by one or more layers of spirally wrapped tape of moisture- and abrasion-resistant insulating material 33, for example, cellulosic material such as cellulose acetate, or other ester thereof, or regenerated cellulose. As pointed out more fully in my co-pending application Serial No. 136,757, filed April 14, 1937, and assigned to the same assignee as the present invention, a layer of an abrasion-resistant material such as cellulose acetate or regenerated cellulose over a varnished cambric tape prevents mechanical abrasion of the latter by the asbestos layers. Further, it prevents solvent attack of the varnished cambric by compositions used as herein described for impregnating and coating the asbestos layers. Such mode of construction provides a definite increase in the average dielectric strength of the composite insulation as compared with composite insulation utilizing varnished cambric tape alone placed between treated asbestos layers.

Under certain conditions of service use, layers 32 and 33 may not be needed, in which case merely one or more layers of treated felted asbestos are applied over binding tape or thread 30.

In the preferred construction there is applied over layer 33 another covering 34 of felted asbestos of the kind, and impregnated in the manner described with reference to asbestos covering 31. Over layer 34 is applied a protective covering 35, for example woven asbestos braid. Such braided covering is then coated and impregnated with a composition comprising plasticized, halogenated aromatic carbon ring compound. A preferred treatment is to saturate the braid with a "Halowax" compound comprising plasticized highly chlorinated naphthalene, dry the braid to evaporate the solvent, and then surface finish the impregnated braid by treatment with a black "Halowax" finishing compound having a flow point of about 74° C. and a working temperature of about 125° to 150° C., which compound also comprises plasticized highly chlorinated naphthalene.

If desired or the conditions of service use so require, a sheath or armor such as a flexible metal armor, for instance of the basket weave type, may be applied over the braided covering 35.

I have found that it is essential for the production of an electrical cable of outstanding flame-resisting characteristics, combined with optimum dielectric strength, moisture resistance, flexibility and ability to keep the conductor in service use for a maximum period of time in the presence of external fire, to superpose on the metal conductor insulation comprising in combination asbestos coated and impregnated with a composition comprising halogenated aromatic carbon ring compound, such for example as highly chlorinated, normally solid, wax-like chlorinated naphthalene, and a rubber compound which itself has optimum age, heat, flame and moisture resistance, together with adequate tensile strength and elongation and set characteristics. Particularly suitable for this purpose is an extrudable rubber compound which has been made flame resisting by incorporation therewith of a suitable amount, for example about 25 to 35 per cent by weight of the whole, of a composition comprising halogenated aromatic carbon ring compound such, for instance, as a "Halowax" compound having a specific gravity of about 1.73 and a melting point of about 130° C. and comprising plasticized chlorinated naphthalene of about 60 per cent chlorination, the unsaturated naphthalene content of the composition being so reduced that the compound does not have an excessive plasticizing effect on the rubber. Other ingredients of such a rubber compound include rubber, sulphur, inorganic filling material, anti-oxidant, plasticizer and one or more accelerators of vulcanization. The rubber compound preferably is extruded upon the wire and is then vulcanized in place. Of course it also may be applied by strip-covering or other known methods.

The vulcanized rubber compounds that are used in carrying this invention into effect have a tensile strength of at least 1200 pounds per square inch, a set in a 2-inch section on a 6-inch test specimen of not more than ⅜ inch, and an elongation (minimum stretch before rupture of a 2-inch section on a 6-inch test specimen) of at least 400 per cent.

A conductor insulated with a rubber composition containing a halogenated aromatic carbon ring compound when used alone as insulation does not have the heat and flame resistance necessary to meet the service requirements hereinbefore specified. Likewise, a conductor insulated with composite insulation including asbestos coated and impregnated with halogenated aromatic carbon ring compound lacks the combined properties required for the type of electrical cable to which this invention relates. Use of such impregnated asbestos in combination with latex or rubber compound containing no such halogenated composition is also ineffective in producing results such as obtained by practicing this invention. The latter combination is not effective because, for one reason, in order to flameproof the ordinary latex or rubber compound, it is necessary to impregnate the asbestos with crystalline compounds halogenated to a very high degree, which therefore means the use of less flexible halogenated compositions. In such case maximum flame resistance of the cable is gained only through loss of flexibility. A cable so made does not adequately meet the flexibility or bending conditions encountered in service use. On the other hand, single-conductor cables produced by this invention have a flexibility such that they may be bent 360 degrees around a mandrel having a diameter twice that of the cable under test without pronounced cracking or opening up of the asbestos wall or asbestos braid.

Compared with the latex wall on the conductor, the flame-resisting rubber insulation used in making the electrical cable of this invention also shows definite superiority in such characteristics as dielectric strength, moisture resistance and aging. Manufacturing defects frequently encountered in employing latex as insulation over the conductor also are obviated. In such properties as moisture and insulation resistance and dielectric strength for a given wall thickness, the preferred rubber compound employed in carrying the present invention into effect is also superior to the so-called "30 per cent rubber compounds" now in use as electrical insulation, which compounds contain no halogenated aromatic carbon ring compounds and are not flame resistant. Such improvement in the rubber insulating layer reflects itself in the finished cable, which has outstanding flame, moisture and insulation resistance and high dielectric strength both dry and after immersion in water.

Various halogenated organic compounds may be used in carrying this invention into effect. For example, in lieu of, or in addition to, the chlorinated or other halogenated naphthalene compounds previously mentioned by way of illustration, anthracene halogenated with different halogens and to different degrees may be used. Hence it is to be understood that halogenated anthracene is the equivalent of halogenated naphthalene insofar as this invention is concerned. Naphthalene, anthracene and the like may be halogenated with only one of the halogens such as chlorine, bromine or iodine, or with a plurality thereof. The highly halogenated aromatic organic compounds of the halogenated naphthalene or anthracene types are crystalline substances which, when used alone as impregnants, tend to crack along the crystal faces. For this reason it is usually desirable to incorporate plasticizing agents with such crystalline halogenated compounds to improve their flexibility. Preferably plasticizing agents which are flame-proofing in themselves are used. Examples of such substances are the chlorinated or otherwise halogenated compounds of diphenyl, acenaphthene and phenanthrene. These substances are amorphous, resin-like solid bodies or syrupy, viscous liquids depending upon the degree of halogenation.

In addition to such halogenated aromatic carbon ring compounds as, for example highly halogenated naphthalene or anthracene plasticized with, for instance, halogenated diphenyl, various halogenated polyphenyl compounds may be used either alone or in combination with other halogenated organic compounds. Thus, for example, chlorinated diphenyl or chlorinated homologues of diphenyl containing at least about 40 per cent combined chlorine and to greater advantage containing by weight about 50 to 65 per cent chlorine may be used as a component of the rubber composition or for coating and impregnating the asbestos. By the term halogenated polyphenyl compound I include also compounds containing a greater number of phenyl groups than diphenyl, an example being halogenated diphenyl benzene. Halogenated diphenyl oxide is another example of a suitable compound. In some cases, the halogenated polyphenyl compounds may contain modifying radicals and still be useful in practicing this invention. For example, I may use organic compounds having phenyl radicals linked together through carbon radicals such as methyl, ethyl, carbonyl or the like. Such compounds are described, for example, in U. S. Patents 2,012,301, 2,012,302 and 2,033,612, which are assigned to the same assignee as the present application.

Other substances which may be incorporated with the halogenated organic compounds, as may be desired or as conditions may require, include asphalts, coal-tar pitches, fatty acid pitches, and other kinds or types of bituminous or pitch-like substances, as well as ceresin, beeswax, and other waxes or wax-like materials. It is desirable, however, that halogenated organic compound of the kind herein mentioned constitute a preponderant proportion of the solid ingredients of the coating and impregnating compositions used in practicing the present invention.

Of course, it also will be understood that electrical cables of the single-conductor type produced in accordance with this invention may have superposed on the conductor a plurality of flame-resisting rubber and treated felted asbestos layers. For example, over the flame-resisting rubber layer may be applied a layer of treated felted asbestos, over the latter a second layer of flame-resisting rubber, and over the second rubber layer a second layer of treated felted asbestos, continuing in such manner until the conductor, with or without a separating layer of different insulating material between the conductor and the described composite insulation, has been provided with insulation of the desired thickness.

Instead of applying the flame-resisting rubber and the felted asbestos separately to a single conductor, as described, these materials may be applied as a unit. For example, a layer or layers of asbestos may be united in any suitable manner with a thin sheet of flame-resisting rubber, either one or both sides of the rubber sheet being covered with asbestos, as the construction may require. The asbestos section of the composite sheet may then be treated with a composition comprising halogenated aromatic carbon ring compound and the treated asbestos-rubber sheet material applied to the conductor.

What I claim as new and desire to secure by Letters Patent of the United States is:

1. A flexible, flame- and moisture-resisting electrical cable of high dielectric strength comprising a metallic conductor and insulation therefor comprising, in direct combination one with the other, at least one layer of vulcanized rubber composition containing halogenated aromatic carbon ring compound, the said rubber composition having a tensile strength of at least 1200 pounds per square inch and a minimum stretch before rupture of a 2-inch section on a 6-inch test specimen of at least 400 per cent, and at least one layer of felted asbestos thereover and which is coated and impregnated with a composition comprising halogenated aromatic carbon ring compound.

2. A flexible, flame- and moisture-resisting electrical cable of high dielectric strength comprising a metallic conductor and insulation therefor comprising, in direct combination one with the other, at least one layer of vulcanized rubber composition containing halogenated aromatic carbon ring compound, the said rubber composition having a tensile strength of at least 1200 pounds per square inch and a minimum stretch before rupture of a 2-inch section on a 6-inch test specimen of at least 400 per cent, and at least one layer of felted asbestos thereover and which is coated and impregnated with a composition comprising halogenated aromatic carbon ring compound, said layers being superposed directly on the conductor, and a protective covering over said insulation.

3. A flexible, flame- and moisture-resisting electrical cable of high dielectric strength comprising a metallic conductor and insulation therefor comprising a layer of vulcanized rubber composition containing halogenated aromatic carbon ring compound on said conductor, the said rubber composition having a tensile strength of at least 1200 pounds per square inch and a minimum stretch before rupture of a 2-inch section on a 6-inch test specimen of at least 400 per cent, and at least one layer of felted asbestos coated and impregnated with a composition comprising halogenated aromatic carbon ring compound superposed directly on said rubber composition, the thus insulated conductor having a flexibility such that it may be bent 360° around a mandrel twice its diameter without pronounced cracking of the said asbestos layer.

4. A flexible, flame- and moisture-resisting electrical cable of high dielectric strength comprising a metallic conductor and insulation therefor comprising a layer of vulcanized rubber composition containing normally solid, highly chlorinated naphthalene interposed between contacting layers of felted asbestos coated and impregnated with a composition comprising chlorinated naphthalene, the said rubber composition having a tensile strength of at least 1200 pounds per square inch and a minimum stretch before rupture of a 2-inch section on a 6-inch test specimen of at least 400 per cent.

5. A flexible, flame- and moisture-resisting electrical cable of high dielectric strength comprising a metallic conductor, flame- and moisture-resisting high dielectric strength composite insulation therefor comprising, in direct combination one with the other, layers of vulcanized rubber composition containing halogenated aromatic carbon ring compound and of felted asbestos coated and impregnated with a composition comprising halogenated aromatic carbon ring compound, said layers being so applied that said asbestos forms the outer of said layers, the said rubber composition having a tensile strength of at least 1200 pounds per square inch and a minimum stretch before rupture of a 2-inch section on a 6-inch test specimen of at least 400 per cent, a separating layer of different insulating material between the metallic conductor and said flame- and moisture-resisting composite insulation, and over the whole a braided protective covering surface finished with a composition comprising halogenated aromatic carbon ring compound.

6. A flexible, flame- and moisture-resisting electrical cable of high dielectric strength comprising a plurality of metallic conductors, each conductor being covered with insulation therefor comprising, in direct combination one with the other, at least one layer of vulcanized rubber composition containing halogenated aromatic carbon ring compound and at least one layer of felted asbestos thereover and which is coated and impregnated with a composition comprising halogenated aromatic carbon ring compound, the said rubber composition having a tensile strength of at least 1200 pounds per square inch and a minimum stretch before rupture of a 2-inch section on a 6-inch test specimen of at least 400 per cent, a protective covering over said insulation, filling material comprising asbestos impregnated with a composition comprising halogenated aromatic carbon ring compound and so formed about the covered conductors as to provide a firm structure of circular cross-section, layers of felted asbestos coated and impregnated with a composition comprising halogenated aromatic carbon ring compound over the filling material and the plurality of covered conductors, and a protective covering over said felted asbestos.

7. A flexible, flame- and moisture-resisting electrical cable of high dielectric strength comprising a plurality of metallic conductors, each conductor being covered with insulation comprising a layer of vulcanized rubber composition containing halogenated aromatic carbon ring compound over the conductor, the said rubber composition having a tensile strength of at least 1200 pounds per square inch and a minimum stretch before rupture of a 2-inch section on a 6-inch test specimen of at least 400 per cent, a covering of felted asbestos coated and impregnated with a composition comprising halogenated aromatic carbon ring compound directly upon said layer of rubber composition, and a braided protective covering surface finished with a composition comprising halogenated aromatic carbon ring compound over said asbestos, each of the thus insulated conductors having a flexibility such that it may be bent 360° around a mandrel twice its diameter without pronounced cracking of the said asbestos covering, filling material comprising asbestos impregnated with a composition comprising halogenated aromatic carbon ring compound and so formed about the covered conductors as to provide a firm structure of circular cross-section, a binding medium over said filling material and covered conductors, layers of felted asbestos coated and impregnated with a composition comprising halogenated aromatic carbon ring compound over said binding medium, at least one layer of moisture-resisting insulation of high dielectric strength between said asbestos layers, and a braided asbestos protective covering surface finished with a composition comprising halogenated aromatic carbon ring compound over the last layer of asbestos.

8. A flexible, flame- and moisture-resisting electrical cable of high dielectric strength comprising a plurality of metallic conductors, each conductor being covered with insulation comprising a layer of vulcanized rubber composition containing normally solid, highly chlorinated naphthalene over the conductor, the said rubber composition having a tensile strength of at least 1200 pounds per square inch and a minimum stretch before rupture of a 2-inch section on a 6-inch test specimen of at least 400 per cent, a covering of felted asbestos coated and impregnated with a composition comprising chlorinated naphthalene over said layer of rubber composition, and a braided protective covering surface finished with a composition comprising chlorinated naphthalene over said asbestos, each of the thus insulated conductors having a flexibility such that it may be bent 360° around a mandrel twice its diameter without pronounced cracking of the said asbestos covering, filling material comprising asbestos impregnated with a composition comprising chlorinated naphthalene and so formed about the covered conductors as to provide a firm structure of circular cross-section, a binding medium over said filling material and covered conductors, a layer of felted asbestos coated and impregnated with a composition comprising chlorinated naphthalene over said binding medium, at least one layer of varnished cambric tape over said felted asbestos, at least one layer of regenerated cellulose over the varnished cambric, a second layer of felted asbestos coated and impregnated with a composition comprising chlorinated naphthalene over the regenerated cellulose, and a braided asbestos protective covering surface finished with a composition comprising chlorinated naphthalene over the last layer of asbestos.

9. In a flame- and moisture-resisting electrical cable of high dielectric strength comprising an insulated metallic conductor, composite insulation for said conductor comprising at least one layer of a vulcanized rubber composition containing a compound having a specific gravity of about 1.73 and a melting point of about 130° C. and comprising plasticized chlorinated naphthalene of about 60 per cent chlorination, said rubber composition having a tensile strength of at least 1200 pounds per square inch, a set in a 2-inch section on a 6-inch test specimen of not more than ⅜-inch and a minimum stretch before rupture of a 2-inch section on a 6-inch test specimen of at least 400 per cent, and over said rubber composition at least one layer of felted asbestos coated and impregnated with a composition comprising chlorinated naphthalene, the said insulated conductor having a flexibility such that it may be bent 360° around a mandrel twice its diameter without pronounced cracking of the said asbestos layer.

10. In a flexible, flame- and moisture-resisting electrical cable of high dielectric strength comprising an insulated metallic conductor, composite insulation for said conductor comprising at least one layer of a vulcanized rubber composition containing a compound having a melting point of the order of about 130° C. and comprising plasticized highly chlorinated naphthalene, said rubber composition having a tensile strength of at least 1200 pounds per square inch and a minimum stretch before rupture of at least 400 per cent, and in direct combination with and surrounding the said rubber layer at least one layer of felted asbestos coated and impregnated with a composition comprising chlorinated naphthalene.

FRED R. KAIMER.